United States Patent [19]
Edge et al.

[11] Patent Number: 5,754,448
[45] Date of Patent: May 19, 1998

[54] SYSTEM AND METHOD FOR COLOR CHARACTERIZATION AND TRANSFORMATION

[75] Inventors: Christopher J. Edge, St. Paul; John Souter, Orono, both of Minn.

[73] Assignee: Minnesota Mining and Manufacturing Company, St. Paul, Minn.

[21] Appl. No.: 501,502

[22] Filed: Jul. 12, 1995

[51] Int. Cl.$^6$ .................................................. H04N 1/46
[52] U.S. Cl. .......................... 364/526; 358/516; 358/518
[58] Field of Search ........................... 364/526; 382/162, 382/167; 358/515–518; 395/131, 132; 348/187–188

[56] References Cited

U.S. PATENT DOCUMENTS

| | | | |
|---|---|---|---|
| 4,500,919 | 2/1985 | Schreiber | 358/78 |
| 4,736,241 | 4/1988 | Murakomi et al. | 358/29 |
| 4,739,392 | 4/1988 | Ueda et al. | 358/29 |
| 4,884,130 | 11/1989 | Huntsman | 358/80 |
| 4,884,221 | 11/1989 | Sugiyama et al. | 364/526 |
| 4,965,663 | 10/1990 | Sasaki | 358/80 |
| 5,012,431 | 4/1991 | Stanziola | 364/526 |
| 5,105,267 | 4/1992 | Hayashi | 358/80 |
| 5,146,323 | 9/1992 | Kobori et al. | 358/516 |
| 5,149,960 | 9/1992 | Dunne et al. | 250/226 |
| 5,170,247 | 12/1992 | Takagi et al. | 358/29 |
| 5,212,546 | 5/1993 | Arazi et al. | 358/80 |
| 5,233,684 | 8/1993 | Ulichney | 395/131 |
| 5,254,978 | 10/1993 | Beyetta | 395/131 |
| 5,339,176 | 8/1994 | Smilansky et al. | 358/504 |
| 5,400,153 | 3/1995 | Schonenberg et al. | 358/516 |
| 5,481,380 | 1/1996 | Bestmann | 358/518 |
| 5,506,696 | 4/1996 | Nakano | 358/515 |
| 5,526,285 | 6/1996 | Campo et al. | 364/526 |
| 5,531,520 | 7/1996 | Grimson et al. | 382/131 |
| 5,541,742 | 7/1996 | Imao et al. | 358/518 |

FOREIGN PATENT DOCUMENTS 2117902 10/1983 United Kingdom.

OTHER PUBLICATIONS

IEEE Transactions on Broadcasting, vol. 38, No. 2, June 1992, New York, pp. 90–97, Po–Rong Chang et al, "A Color Constancy Model for Advanced Television Cameras".

Applied Optics, vol. 29, No. 34, 1 Dec. 1990, New York, pp. 5187–5192, S. Suzuki et al, "Color Characteristic Design for Color Scanners".

10$^{th}$ International Conference on Pattern Recognition, vol I, 16 Jun. 1990, Atlantic City, N.J., pp. 803–807, S. Tominaga, "A Color Classification Method for Color Images Using a Uniform Color Space".

Mark D. Fairchild and Roy S. Berns, "Image Color— Appearance Specification Through Extension of CIELAB", *Color Research and Application*, vol. 18, No. 3, Jun. 1993, pp. 178–190.

R.W.G. Hunt, "Revised Colour—Appearance Model for Related and Unrelated Colours", *Color Research and Application*, vol. 16, No. 3, Jun. 1991, pp. 146–165.

Gunter Wyszecki and W.S. Stiles, "Chromatic Adaptation", *Color Science, Concepts and Methods, Quantitative Data and Formulae*, 2nd Edition, 1982, pp. 429–450.

International Color Consortium, "International Color Profile Format", version 3.0, Jun. 10, 1994.

*Primary Examiner*—James P. Trammell
*Assistant Examiner*—Bryan Bui
*Attorney, Agent, or Firm*—Kent J. Sieffert

[57] ABSTRACT

A system and method for color characterization and transformation obtain color data representing output of a color imaging system, and convert the color data using a color space having a white reference vector that is adjusted during the conversion. The white reference vector can be adjusted according to intensities of the color data being converted. Adjustment of the white reference vector serves to avoid nonuniformities for color imaging systems having different imaging bases, and thereby eliminates, or at least reduces, the amount of empirical adjustment necessary to obtain an acceptable visual match between the color imaging systems.

19 Claims, 5 Drawing Sheets

SYSTEM AND METHOD FOR COLOR CHARACTERIZATION AND TRANSFORMATION

FIELD OF THE INVENTION

The present invention relates generally to color imaging technology and, more particularly, to techniques for color characterization and transformation.

DISCUSSION OF RELATED ART

Since the introduction of the CIE (Commission International de l'Eclairage) color measurement system in the early 1930's, many different color spaces have been proposed for different applications. A color space, also referred to as a color "metric," is essentially a coordinate system by which a color can be quantified.

A color space can be used to characterize the color output of a color imaging system relative to other color imaging systems. The process of "characterizing" a color imaging system generally refers to the calculation of a color response function for the particular color imaging system using the coordinates of the color space. The color response function is the mathematical correlation between a range of input color values and measured color values obtained for output generated by the color imaging system in response to such input color values.

A color space also facilitates transformation of color values to produce a color output in one color imaging system that matches the color output of a different color imaging system. In terms of imaging science, an "ideal" color space would allow a user to calculate a color mapping between different color imaging systems and to achieve an acceptable color appearance match between such systems without the need for subjective or empirical adjustment by an observer. The term "color appearance" refers to the psychophysical response of an observer to a color under given levels of illumination and under given viewing conditions.

Proposed color spaces differ primarily with respect to the parameters expressed on the coordinate axes and the manner in which such parameters are calculated. Common to all color spaces proposed for CIE color systems, however, are the CIE Standard Observer functions. The CIE Standard Observer functions are based on color matching functions and result in a unique set of tristimulus values XYZ for any color measured under specified conditions. The tristimulus values XYZ are calculated from the spectral output of either an additive or subtractive color system convoluted with the response function of either a 2 degree or 10 degree Standard Observer. In the case of reflective hard copy, the spectral reflectance curve is typically convoluted with a standard illuminant to estimate the expected spectral output of the reflective color.

One color space that has been the subject of a number of proposals is the CIELAB color space. In this color space, $L^*$ represents lightness, $a^*$ represents redness-greenness, and $b^*$ represents yellowness-blueness. According to the von Kries chromatic-adaptation transform, the proposed $L^*a^*b^*$ color spaces make use of white reference tristimulus data. A description of the von Kries chromatic-adaptation transform can be found in Gunter Wyszecki and W. S. Stiles, Color Science: Concepts and Methods, Quantitative Data and Formulae, section 5.12, John Wiley & Sons, Inc., 1982. In general, the von Kries chromatic-adaptation transform involves dividing the tristimulus values XYZ obtained for a color produced by a particular color imaging system by white reference tristimulus values for the system. For example, the X, Y, and Z tristimulus values of the color under study can be divided, respectively, by the X, Y, and Z tristimulus values for a perfectly diffuse white reflector. The basic concept of the Von Kries approach is to define all colors, both neutral and chromatic, relative to the "white reference" representing the XYZ tristimulus values of the perfectly diffuse white reflector.

Perhaps the most well known of the proposed color spaces is the CIE 1976 CIELAB color space. The equations for the CIELAB color space are as follows:

$$L^* = 116(Y/Y_n)^{1/3} - 16 \quad [1]$$

$$a^* = 500[(X/X_n)^{1/3} - (Y/Y_n)^{1/3}] \quad [2]$$

$$b^* = 500[(Y/Y_n)^{1/3} - (Z/Z_n)^{1/3}] \quad [3]$$

where $X_n$, $Y_n$, and $Z_n$ are the tristimulus values of a perfectly diffuse white reflector under specified viewing conditions. The viewing conditions are determined by (1) the illuminant, e.g., $D_{50}$, and (2) the Standard Observer (2° or 10°).

Another proposed $L^*a^*b^*$ color space ("ICPF LAB"), described by the International Color Consortium in section 2.5 of International Color Profile Format (ICPF) Proposal No. ISO/TC 130/WG2 N, Jun. 10, 1994, uses $X_{mw}Y_{mw}Z_{mw}$, in lieu of $X_n Y_n Z_n$, where "mw" denotes the media white reference for a particular imaging system. The media white reference refers to either the color of an imaging substrate or the white point produced by a color display. This proposed color space is based on the ColorSync standard developed by Apple Computer. In this color space, the imaging substrate or display serves as the white reference instead of a perfectly diffuse white reflector. With a color printing system, for example, the white reference is the color of the subtractive printing substrate. The media white reference therefore represents the tristimulus XYZ values for the unimaged printing substrate. With a color display, the white reference is the white point produced by an additive phosphor screen or liquid crystal matrix.

One color space ("HUNT LAB"), proposed by R. W. G. Hunt, in "Revised colour-appearance model for related and unrelated colours," Color Research and Application, volume 16, 1991, pages 146–165, provides an improved model that addresses incomplete chromatic adaptation. The HUNT LAB color space recognizes that chromatic adaptation does not completely account for changes due to the white reference of a particular color imaging system. The HUNT LAB color space seeks to take such changes into consideration by producing a modified set of white reference tristimulus values using a complex transformation.

In "Image Color-Appearance Specification Through Extension of CIELAB," Color Research and Application, volume 18, number 3, June, 1993, pages 178–190, Mark D. Fairchild and Roy S. Berns propose a variation of the HUNT LAB color space, known as "RLAB." The RLAB color space modifies the scaling factors $1/X_n$, $1/Y_n$, $1/Z_n$ according to whether the "white reference" is slightly off-white or significantly different from neutral. Specifically, the RLAB color space introduces a fixed correction factor p calculated as a function of $X_n$, $Y_n$, and $Z_n$, where $X_n$, $Y_n$, and $Z_n$ denote the "media white" values. In the RLAB color space, the tristimulus values of XYZ are first transformed via matrix multiplication into "long, middle, and short wavelength" tristimulus values $L_1$, $M_1$, and $S_1$. The equation for p is based on $Y_n$ and on $L_n$, $M_n$, and $S_n$, which in turn are functions of $X_n$, $Y_n$, and $Z_n$. In the RLAB color space, the ratios $X/X_n$, $Y/Y_n$, and $Z/Z_n$ become $(L_1 \, p_L/L_n)$, $(M_1 \, p_M/M_n)$, $(S_1 \, p_S/S_n)$.

Various comparative tests using human observers have been performed to debate the efficacy of the above color spaces and other color spaces. The existing color spaces discussed above generally are helpful for characterizing relative color within a particular color imaging system, given a particular imaging media and a particular set of viewing conditions. Such color spaces are less helpful, however, in characterization or color transformation between two different color imaging systems. One problem not addressed by the existing color spaces is the effect of variation in the white references for different color imaging systems due to differences in the imaging substrate or display white point.

As an illustration, the CIELAB color space has been observed to produce nonuniformities when used to match color proofing systems having different imaging substrate white references. In particular, the CIELAB color space has been observed to produce severe nonuniformities when mapping from a substantially white imaging base to a somewhat blue-shifted imaging base. The ICPF color space has been observed to produce uniform mapping in light shades of color, but less uniform mapping with more intense colors. Due to such nonuniformity, after a transformation function has been generated to match L*a*b* values between two color imaging systems, it ordinarily will be necessary for a human operator to engage in significant empirical adjustment to obtain an acceptable visual match. The necessary empirical adjustment is extremely labor-intensive and often can require more than a week for completion.

In view of the disadvantages associated with existing color spaces, there is a need for an improved color space. In particular, there is a need for a system and method for color characterization and transformation that uses an improved color space capable of avoiding nonuniformities for color imaging systems having different imaging bases. Such a system and method would eliminate, or at least reduce, the amount of empirical adjustment necessary to obtain an acceptable visual match between the different color imaging systems.

SUMMARY OF THE INVENTION

In a first embodiment, the present invention provides a system and method for characterizing a color imaging system. The system and method, in accordance with this first embodiment of the present invention, obtain color data representing output of the color imaging system, and convert the color data using a color space having a white reference vector that is adjusted during the conversion.

In a second embodiment, the present invention provides a system and method for characterizing a color imaging system. The system and method, in accordance with this second embodiment of the present invention, obtain first color data representing output of the color imaging system, convert the first color data to second color data using a color space, and adjust a white reference vector of the color space during the conversion according to intensities of the first color data.

In a third embodiment, the present invention provides a system and method for performing a color transformation. The system and method, in accordance with this third embodiment of the present invention, obtain first color data representing output of a first color imaging system, obtain second color data representing output of a second color imaging system, convert the first color data to third color data using a color space, convert the second color data to fourth color data using the color space, adjust a white reference vector of the color space during the conversion of the first color data according to intensities of the first color data, adjust the white reference vector of the color space during the conversion of the second color data according to intensities of said second color data, and map the fourth color data to the third color data to generate color transformation data.

The advantages of the system and method of the present invention will be set forth in part in the description that follows, and in part will be apparent from the description, or may be learned by practice of the present invention. The advantages of the system and method of the present invention will be realized and attained by means particularly pointed out in the written description and claims, as well as in the appended drawings. It is to be understood, however, that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
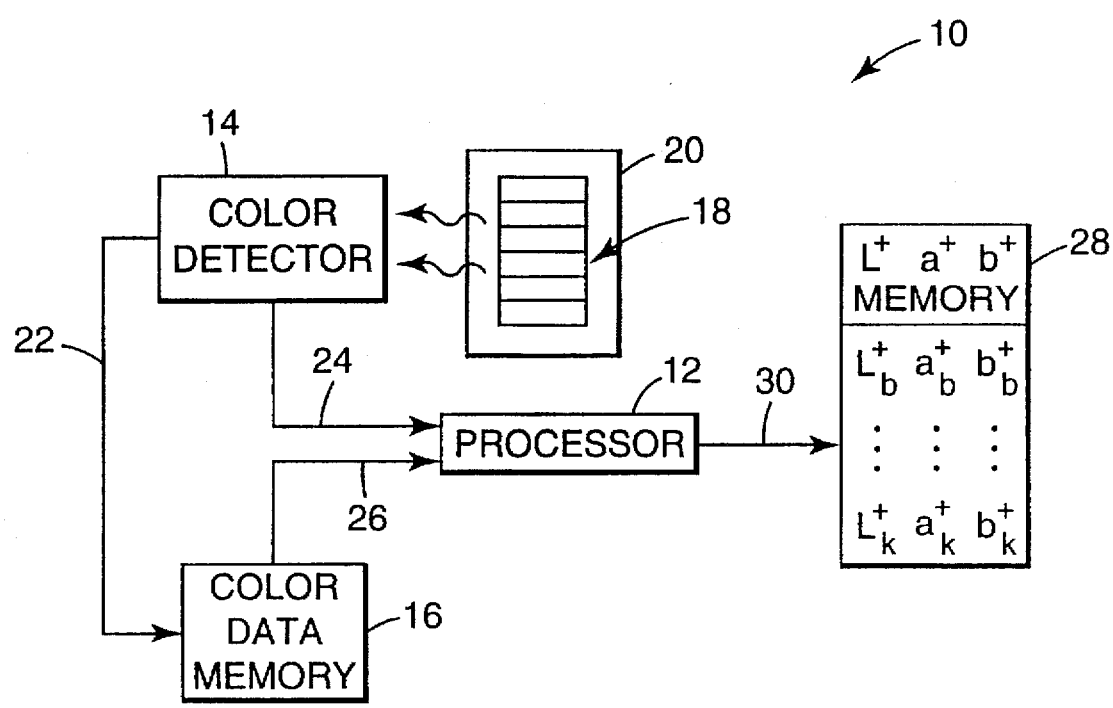
FIG. 1 is a functional block diagram of a system for characterizing a color imaging system, in accordance with a first embodiment of the present invention.

FIG. 1 is a functional block diagram of a system 10 for characterizing a color imaging system, in accordance with a first embodiment of the present invention. This characterization, also commonly referred to as "profiling," can be used to analyze a single color imaging system, or as a basis to transform the color response of the color imaging system to match the color response of another "target" color imaging system. The system 10 of FIG. 1 may be used to implement the steps of a method for characterizing a color imaging system, in accordance with this first embodiment of the present invention. Accordingly, the method of the first embodiment of the present invention will be described in terms of the functionality of system 10.

As shown in FIG. 1, system 10 includes a processor 12 that executes a software application program configured to carry out the steps of a method for characterizing a color imaging system, in accordance with this first embodiment of the present invention. The processor 12 can be realized, for example, by a personal computer such as an Apple Macintosh™ or an IBM PC, or by a computer workstation. Alternatively, processor 12 could be realized by a microprocessor that accesses a read-only memory (ROM) into which the application program is loaded. The application program could be embedded in a color management software package, such as that provided with the 3M Rainbow™ color proofing system, commercially available from Minnesota Mining & Manufacturing Company, of St. Paul, Minn. The implementation of system 10 and the method via software affords flexibility in development and modification. The system and method alternatively can be implemented by an integrated logic circuit, however, for increased color processing speed.

In addition to processor 12, system 10 includes means for obtaining color data representing the output of a color imaging system. Examples of color imaging systems to which system 10 and the method of the present invention can be applied include color printing systems, color display systems, and color projection systems. As shown in FIG. 1, the color data can be obtained directly from a color imaging system via a color detector 14, or by accessing a color data file stored in a color data memory 16. With a printing system, for example, color detector 14 may be configured to measure color values for color patches 18 formed on a printing substrate 20, as shown in FIG. 1. With a color display, color detector 14 may be configured to measure color values produced on a phosphor screen or liquid crystal matrix. Similarly, color detector 14 may be equipped to measure color values produced by a color projection system. As one illustration, color detector 14 could be configured to capture a scene or an animated sequence from a display or projection system, and generate color values representative of the captured imagery.

The color detector 14 may comprise, for example, a color measurement system such as a Greta SM 50 color measurement device, commercially available from Gretag, Inc., of Regensdorf, Switzerland, or a densitometer, such as an X-Rite color densitometer, commercially available from X-Rite, of Grandville, Mich. For display or projection system applications, color detector 14 alternatively could comprise a video camera or digital camera. The color data obtained by color detector 14 may be loaded into color data memory 16 as a color data file, as indicated by line 22. Alternatively, the color data obtained by color detector 14 could be directly loaded into a memory associated with processor 12, as indicated by line 24. The processor 12 can access the color data file stored in color data memory 16, as indicated by line 26, to obtain color data previously detected by color detector 14. The color data memory 16 may store several color data files for a variety of different color imaging systems. Thus, a system user can direct processor 12, via a user interface associated with system 10, to select one of the various color data files for purposes of characterizing a particular color imaging system of interest to the system user.

The color data obtained from either color detector 14 or color data memory 16 preferably represents CIE XYZ tristimulus values for each of a variety of color outputs generated by a color imaging system under study. Alternatively, the color data can be converted to CIE XYZ tristimulus values. In addition, the color data preferably represents color outputs distributed across the color gamut of the color imaging system to thereby provide a broad sampling for purposes of color characterization. Thus, in the case of a printing system, color patches 18 represent various combinations and gradations of colors formed by dye transfer or ink deposition. The CIE XYZ tristimulus values represent the relative amounts of primary color stimuli required to match colors within a CIE color system. The relative values of XYZ are influenced by the power distribution of the illuminant, e.g., $D_{50}$, and the CIE Standard Observer function, e.g., 2° or 10°. As an alternative to CIE XYZ, the color data can be, for example, in the form of RGB data, CMYK density data, or other device dependent data.

To characterize the color imaging system, in accordance with the present invention, processor 12 converts the color data obtained from either color detector 14 or color data memory 16 using a color space having a white reference vector that is adjusted during the conversion. Specifically, processor 12 converts the color data into second color data and adjusts the white reference vector of the color space during the conversion according to intensities of the original color data. In the context of the present invention, intensity refers to degree of difference of a color value from the media white or the white point of the color imaging system. The term intensity may refer to both chromatic and achromatic colors. By adjusting the white reference vector, processor 12 produces a modified L*a*b* color space. In accordance with the present invention, the modified L*a*b* color space will be referred to herein as $L^+a^+b^+$ color space. As shown in FIG. 1, processor 12 converts the color data obtained from tither color detector 14 or color data memory 16 to produce the $L^+a^+b^+$ color data and stores the resulting $L^+a^+b^+$ color data in an $L^+a^+b^+$ memory 28, as indicated by line 30.

The term "white reference vector" refers to the vector defined by the tristimulus values $X_N$, $Y_N$, $Z_N$ obtained for a reference associated with the color imaging system. In the CIELAB color space, the white reference vector is fixed and comprises tristimulus values $X_N$, $Y_N$, $Z_N$ for a perfectly diffuse white reflector. In the ICPF LAB color space described by the International Color Consortium in section 2.5 of International Color Profile Format (ICPF) Proposal No. ISO/TC 130/WG2 N, Jun. 10, 1994, the white reference vector is fixed and comprises "media white" tristimulus values $X_{mw}$, $Y_{mw}$, $Z_{mw}$ for an imaging base associated with the particular color imaging system. With a color printing system, for example, the imaging base is the printing substrate to which colorants will be applied to form an image. With a color display or color projection system, the imaging base is the white point produced by the display or projection system.

In the HUNT LAB color space described by R. W. G. Hunt, in "Revised colour-appearance model for related and unrelated colours," Color Research and Application, volume 16, 1991, pages 146–165, the white reference vector also is fixed. In the RLAB color space, described by Fairchild and Berns, in "Image Color-Appearance Specification Through Extension of CIELAB," Color Research and Application, volume 18, number 3, June, 1993, pages 178–190, the white reference vector is fixed and represented by $(p_L/L_n)$, $(p_M/M_n)$, $(p_S/S_n)$, where $L_n$, $M_n$, and $S_n$ are "long, middle, and short wavelength" tristimulus values for media white, and $p_L$, $p_M$, and $p_S$ are correction factors calculated according to the deviation of the media white from true white.

Unlike the proposed L*a*b* color spaces discussed above, the white reference vector for the L$^+$a$^+$b$^+$ color space of the present invention is not fixed, but rather is adjusted during color conversion. The imaging base of the color imaging system influences calculation of the white reference, as will be apparent from additional discussion below. However, the white reference vector is adjusted during color conversion according to the intensity of the original color data being converted. Adjustment of the white reference vector based on color intensity, in accordance with the present invention, provides more accurate color characterization over the entire range of a color imaging system. In particular, adjustment of the white reference vector ensures substantial uniformity of the color characterization for both light color shades and more intense colors.

Figure 2:
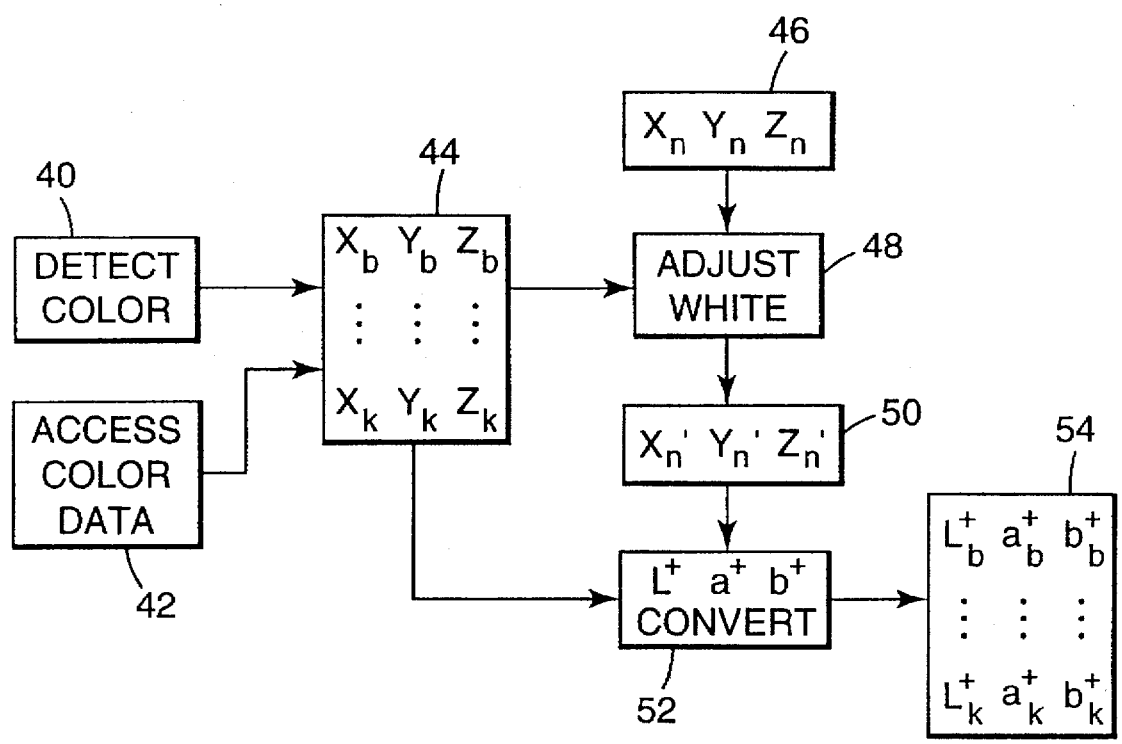
FIG. 2 is a functional block diagram illustrating the functionality of a system and method for characterizing a color imaging system, in accordance with the first embodiment of the present invention.

FIG. 2 is a functional block diagram illustrating the functionality of system 10 and a method for characterizing a color imaging system, in accordance with the first embodiment of the present invention. The processor 12 can convert the color data obtained from either color detector 14 or color data memory 16 to second color data using any of the existing L*a*b* color spaces, such as CIELAB, RLAB, etc., subject to adjustment of the white reference vector, in accordance with the L$^+$a$^+$b$^+$ color space of the present invention. The CIELAB color space will be used, however, for purposes of illustration in describing the functionality of the first embodiment of the present invention.

With reference to FIG. 2, color data is first obtained for a particular color imaging system by either detecting color data produced by the color imaging system, as indicated by block 40, or accessing color data in a color data file, as indicated by block 42. The resulting color data, indicated by block 44, comprises an array of CIE XYZ data [($X_b$, $Y_b$, $Z_b$) ... ($X_k$, $Y_k$, $Z_k$)]. In the array indicated by block 44, the vector ($X_b$, $Y_b$, $Z_b$) represents the color data obtained for the imaging base associated with the color imaging system. Thus, the vector ($X_b$, $Y_b$, $Z_b$) represents either the color of an imaging substrate or the white point produced by a color display or color projection system. The vector ($X_k$, $Y_k$, $Z_k$) represents the color data obtained for a maximum color output produced by the color imaging system. More explicitly, the value of $X_k$ is given by the value of X which satisfies:

$$MAX(ABS(X-X_b))$$

for all values of X measured from all possible colors imaged by the system, where ABS returns the absolute value of the difference value in parentheses, and MAX returns the maximum difference value for all values of X relative to $X_b$. Values of $Y_k$ and $Z_k$ can be similarly defined. The array indicated by block 44 also will include a number of intermediate vectors distributed across the range of the color imaging system.

In FIG. 2, block 46 indicates the white reference vector ($X_n$, $Y_n$, $Z_n$) for the color imaging system. In the CIELAB color space, the white reference vector ($X_n$, $Y_n$, $Z_n$) ordinarily would represent the color data obtained for a perfectly diffuse white reflector. In the L$^+$a$^+$b$^+$ color space of the present invention, the white reference vector ($X_n$, $Y_n$, $Z_n$) is calculated as a function of the imaging base vector ($X_b$, $Y_b$, $Z_b$), and is adjusted according to the particular color data being converted, as indicated by block 48 of FIG. 2. In particular, the white reference vector ($X_n$, $Y_n$, $Z_n$) is adjusted for each set of color data shown in block 44 according to the intensity of the color data. Adjustment of the white reference vector ($X_n$, $Y_n$, $Z_n$) results in a new white reference vector ($X_n'$, $Y_n'$, $Z_n'$), as indicated by block 50. The new white reference vector ($X_n'$, $Y_n'$, $Z_n'$) then is used for conversion of the set of color data. Specifically, as indicated by block 52, the new white reference vector ($X_n'$, $Y_n'$, $Z_n'$) is used as the basis for conversion of the set of color data to modified L*a*b* color data. The modified L*a*b* is designated as L$^+$a$^+$b$^+$ color data in block 54 of FIG. 2.

In accordance with the present invention, the white reference vector ($X_n$, $Y_n$, $Z_n$) can be adjusted to form the new white reference vector ($X_n'$, $Y_n'$, $Z_n'$) according to the following equations:

$$X_n'=X_b(1-SAT(X,Y,Z))+X_n*SAT(X,Y,Z) \quad [4]$$

$$Y_n'=Y_b(1-SAT(X,Y,Z))+Y_n*SAT(X,Y,Z) \quad [5]$$

$$Z_n'=Z_b(1-SAT(X,Y,Z))+Z_n*SAT(X,Y,Z) \quad [6]$$

where:

$$SAT(X,Y,Z) = \quad [7]$$
$$MAX((X-X_n)/(X_k-X_n),(Y-Y_n)/(Y_k-Y_n),$$
$$(Z-Z_n)/(Z_k-Z_n)),$$

where $X_b$, $Y_b$, $Z_b$ are tristimulus values obtained for an imaging base associated with the color imaging system, and where $X_k$, $Y_k$, $Z_k$ are tristimulus values of maximum intensity values for XYZ in the color imaging system. The "MAX" operator in equation [7] returns the maximum value of the parameters enclosed in parentheses, e.g., $(X-X_n)/(X_k-X_n)$.

For color characterization, the adjusted white reference vector ($X_n'$, $Y_n'$, $Z_n'$) can be applied to the CIELAB equations as follows:

$$L*=116*Y/Y_n')^{1/3}-16 \quad [8]$$

$$a*=500[(X/X_n')^{1/3}-(Y/Y_n')^{1/3}] \quad [9]$$

$$b*=500[(Y/Y_n')^{1/3}-(Z/Z_n')^{1/3}] \quad [10]$$

Application of equations [8]–[10] to the color data obtained for the color imaging system, in combination with the adjustment of the white reference vector ($X_n'$, $Y_n'$, $Z_n'$) as in equations [4]–[7], produces a set of color data in L$^+$a$^+$b$^+$ space that characterizes the color response of the color imaging system. In practice, the values $X_k$, $Y_k$, $Z_k$ in equations [4]–[7] generally can be set to zero for simplicity, because the values of XYZ become very small in the most intense colors, e.g., maximum black. After converting the color data using L$^+$a$^+$b$^+$ color space, conventional multidimensional interpolation can be performed to produce a more complete characterization of the color imaging system.

The application of equations [4]–[7] above to produce the adjusted white reference vector ($X_n'$, $Y_n'$, $Z_n'$), in accordance with the present invention, is based on the following assumptions about the color imaging systems being characterized. First, it is assumed that the white reference vectors ($X_n$, $Y_n$, $Z_n$) of two different color imaging systems may be different even if the illuminant is the same. With color printing systems, for example, the white reference vectors will be different for images observed on differently colored printing substrates under the same viewing conditions. Similarly, the white reference vectors can be different due to different white points produced by different color displays or color projection systems. Second, it is assumed that the achievable colors of the target color imaging system to be matched are generally within the color gamut of the system which is to be transformed in order to match it, even if the white references are not the same. Thus, if the printing substrates or displays on which two images are formed differ by 6 delta E according to the 1976 CIE definition, it can often be the case that the more intense colors can still be matched to 1 delta E.

Third, if the first and second assumptions above are correct, then "partial chromatic adaptation" must be reinterpreted to mean that von Kries-type scaling, as used in the ICPF LAB color space, is appropriate in the lighter shades of color, but is not appropriate in the more intense areas. Thus, regardless of whether one uses CIELAB, ICPF LAB, HUNT LAB, RLAB, or any other color space, the white reference vectors can be different for two different imaging systems in the less intense colors, i.e., close to the white reference of the imaging base, or "media white," but should converge to be substantially the same in the more intense regions of color space. Even if the media are different, such as a display and paper hard copy, substantially the same values for the white reference vectors should be used for the two systems for highly intense colors. The $L^+a^+b^+$ color space of the present invention is constructed to cause conversion of the white reference vector in more intense regions, as is apparent from equations [4]–[6] above.

Equations similar to equations [4]–[7] above can be used for other L*a*b* color spaces. For example, the RLAB color space equations can be modified by adjusting the white reference vector ($L_n$, $M_n$, $S_n$) according to color data intensity as follows:

$$L_n = L_b(1-SAT(L,M,S)) + L_n * SAT(L,M,S) \quad [11]$$

$$M_n = M_b(1-SAT(L,M,S)) + M_n * SAT(L,M,S) \quad [12]$$

$$S_n = S_b(1-SAT(L,M,S)) + S_n * SAT(L,M,S), \quad [13]$$

where $$SAT(L,M,S) = \quad [14]$$
$$MAX((L - L_n)/(L_k - L_n), (M - M_n)/(M_k - M_n),$$
$$(S - S_n)/(S_k - S_n)).$$

For simplicity, each of the SATO equations [7] and [13] above has been represented as a linear function. More complex functions may be desirable, however, to achieve improved visual results. For example, the white reference vector can be adjusted using the following SAT() function:

$$SAT(X,Y,Z) \rightarrow F(SAT(X,Y,Z)) \quad [15]$$

where function F() is an nth order polynomial of the form:

$$F(x) = a_0 + a_1 x + a_2 X^2 + \ldots a_n x^n. \quad [16]$$

Alternatively, the white reference vector could be adjusted using a SAT() function as follows:

$$SAT(X,Y,Z) \rightarrow F(L^*, C^*) \quad [17]$$

where L* and C* are indicative of levels of lightness and colorfulness, respectively, and are based on powers of $1/\gamma$ and differences of powers of $1/\gamma$, where $3 < \gamma < 4.5$ depending on surrounding conditions determined according to the HUNT LAB color space.

Figure 3:
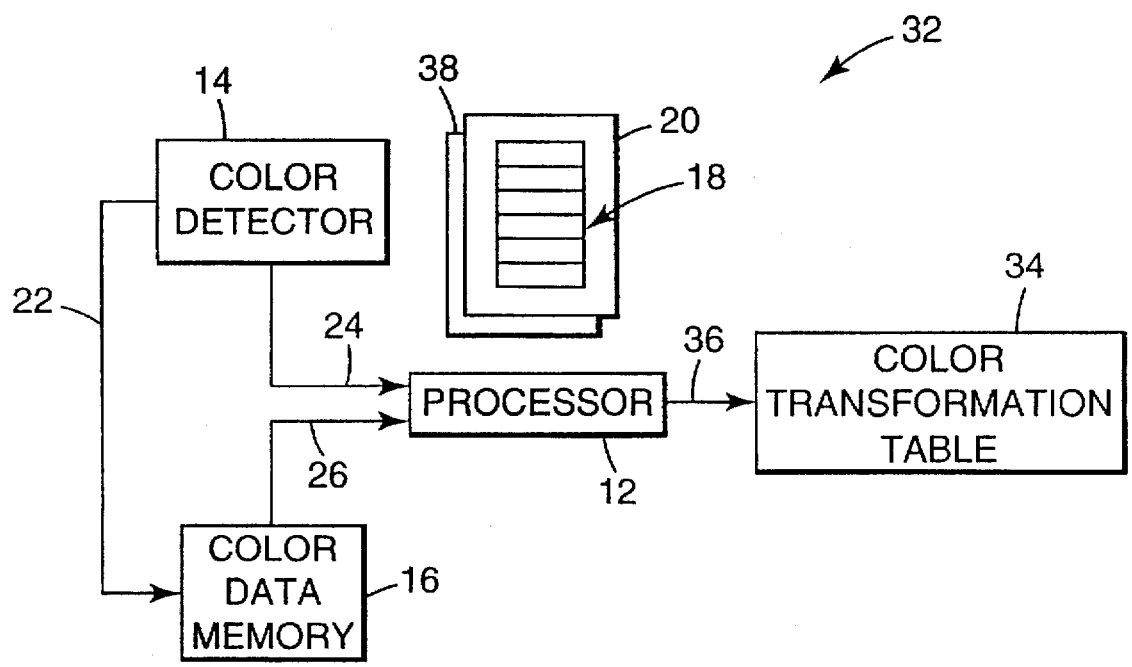
FIG. 3 is a functional block diagram of a system for performing a color transformation, in accordance with a second embodiment of the present invention.

FIG. 3 is a functional block diagram of a system 32 for performing a color transformation, in accordance with a second embodiment of the present invention. The system 32 substantially corresponds to system 10 of FIG. 1. For example, system 32 includes a processor 12, a color detector 14, and a color data memory 16. The functionality of system 32 also substantially corresponds to that of system 10 of FIG. 1. However, system 32 characterizes two or more different color imaging systems and calculates a mapping between the color imaging systems based on the characterizations. The mapping can be used to generate a color transformation table 34, as indicated by line 36. The color transformation table 34 then can be used to produce a color response on one color imaging system that visually matches the color response on the other, "target" color imaging system.

In accordance with this second embodiment of the present invention, color detector 14 is configured to obtain color data representing the output of two or more color imaging systems. As shown in FIG. 3, for example, color detector 14 may be configured to detect color data from color patches 18 formed on a first printing substrate 20 by a first color imaging system and color patches formed on a second printing substrate 38 by a second color imaging system. With different color monitor displays, color detector 14 may be configured to measure color values produced on phosphor screens or liquid crystal matrices associated with the displays. Similarly, color detector 14 may be used to measure color values produced by a different projection systems. The color data for the different color imaging systems alternatively can be obtained by accessing color data files stored in color data memory 16.

As in the first embodiment, the color data obtained from either color detector 14 or color data memory 16 preferably represents CIE XYZ tristimulus values for each of a variety of color outputs generated by the different color imaging systems. To perform a color transformation, in accordance with the present invention, processor 12 converts the color data obtained for each of the different color imaging systems using the $L^+a^+b^+$ color space of the present invention, in which the white reference vector is adjusted during the conversion. Specifically, processor 12 converts first color data obtained for a first color imaging system using a color space having a white reference vector that is adjusted according to intensities of the first color data, and converts second color data obtained for a second color imaging system using a color space that is adjusted according to intensities of the second color data. As in the first embodiment, adjustment of the white reference vector during conversion of the first color data and the second color data produces modified L*a*b* color spaces for the respective data, referred to herein as $L^+a^+b^+$ color spaces.

Figure 4:
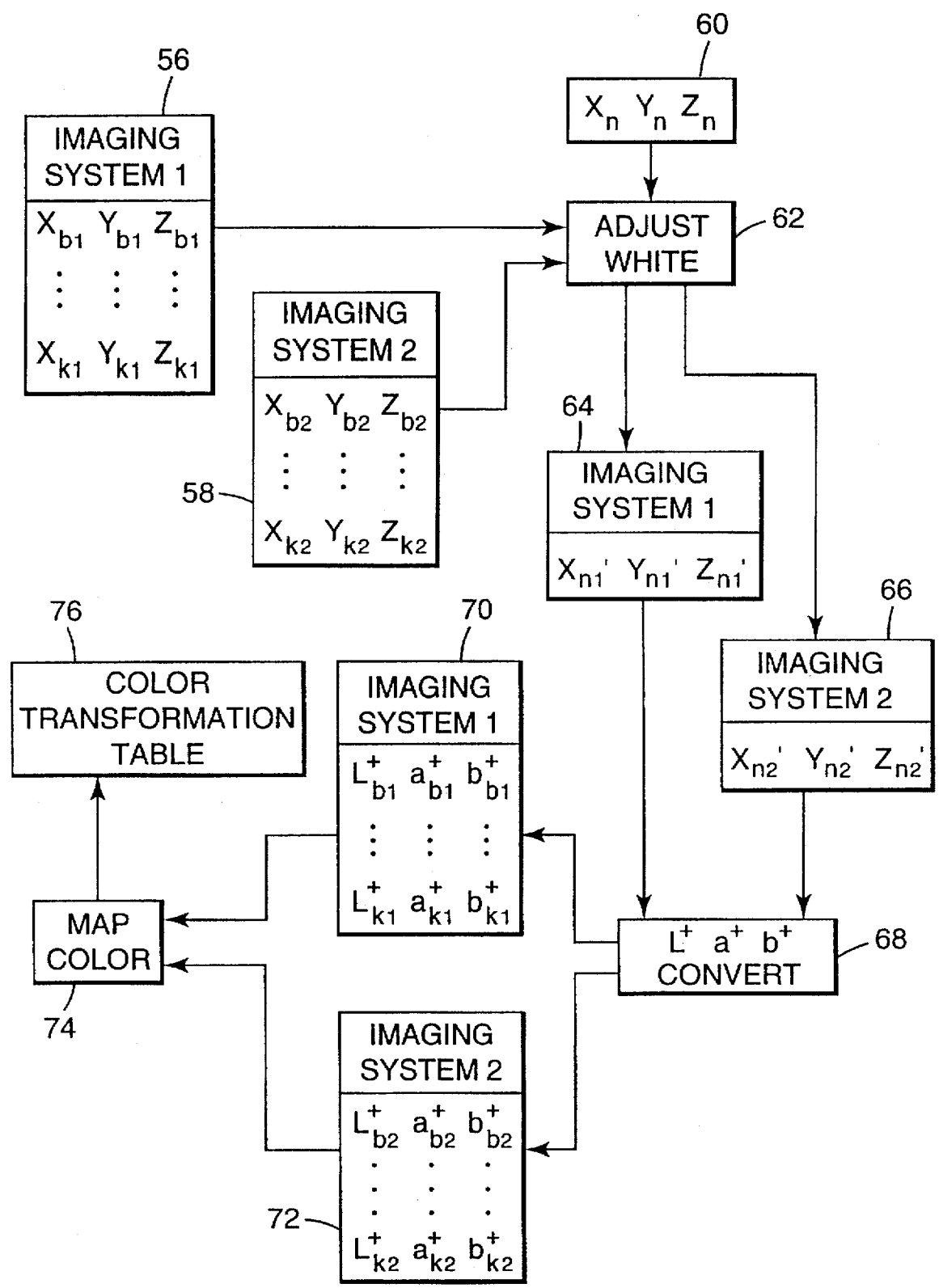
FIG. 4 is a functional block diagram illustrating the functionality of a system and method for performing a color transformation, in accordance with the second embodiment of the present invention.

FIG. 4 is a functional block diagram illustrating the functionality of system 32 and a method for performing a color transformation, in accordance with the second embodiment of the present invention. As shown in FIG. 4, color data is obtained for a first color imaging system, as indicated by block 56, and for a second color imaging system, as indicated by block 58. The resulting color data for the first color imaging system comprises an array of CIE XYZ data [($X_{b1}$, $Y_{b1}$, $Z_{b1}$) ... ($X_{k1}$, $Y_{k1}$, $Z_{k1}$)], whereas the color data for the second color imaging system comprises an array of CIE XYZ color data [($X_{b2}$, $Y_{b2}$, $Z_{b2}$) ... ($X_{k2}$, $Y_{k2}$, $Z_{k2}$)]. As in the first embodiment, the vector ($X_{b1}$, $Y_{b1}$, $Z_{b1}$) represents the color data obtained for the imaging base associated with the first color imaging system, and the vector ($X_{b2}$, $Y_{b2}$, $Z_{b2}$) represents the color data obtained for the imaging base associated with the second color imaging system. Similarly, the vector ($X_{k1}$, $Y_{k1}$, $Z_{k1}$) represents the color data obtained for a maximum intensity color produced by the first color imaging system, and the vector ($X_{k2}$, $Y_{k2}$, $Z_{k2}$) represents the color data obtained for a maximum intensity color produced by the second color imaging system. Again, the value of $X_{k1}$ is given by the value of $X_1$ which satisfies:

$$MAX(ABS(X_1-X_b))$$

for all values of $X_1$ measured from all possible colors imaged by the system, where ABS returns the absolute value of the difference value in parentheses, and MAX returns the maximum difference value for all values of $X_1$ relative to $X_b$. Values of $Y_{k1}$, $Z_{k1}$, $X_{k2}$, $Y_{k2}$, and $Z_{k2}$ can be similarly defined.

In FIG. 4, block 60 indicates the white reference vector ($X_n$, $Y_n$, $Z_n$) for each of the color imaging systems. In the $L^+a^+b^+$ color space of the present invention, the white reference vector ($X_n$, $Y_n$, $Z_n$) for each color imaging system is calculated as a function of the imaging base vector ($X_b$, $Y_b$, $Z_b$) for the respective color imaging system, and is adjusted according to the particular color data being characterized, as indicated by block 62 of FIG. 4. In particular, the white reference vector ($X_n$, $Y_n$, $Z_n$) for the first color imaging system is adjusted according to the intensity of the color data indicated in block 56, whereas the white reference vector ($X_n$, $Y_n$, $Z_n$) for the second color imaging system is adjusted according to the intensity of the color data indicated in block 58. Adjustment of the white reference vector ($X_n$, $Y_n$, $Z_n$) for each color imaging system results in new white reference vectors ($X_{n1}'$, $Y_{n1}'$, $Z_{n1}'$) and ($X_{n2}'$, $Y_{n2}'$, $Z_{n2}'$), indicated by blocks 64 and 66, respectively. The new white reference vectors ($X_{n1}'$, $Y_{n1}'$, $Z_{n1}'$) and ($X_{n2}'$, $Y_{n2}'$, $Z_{n2}'$) are used for characterization of the color data for each color imaging system by conversion using the $L^+a^+b^+$ color space, as indicated by block 68. The conversion results in new $L^+a^+b^+$ color data for each of the color imaging systems, as indicated by blocks 70 and 72, respectively.

As in the first embodiment, the white reference vector ($X_n$, $Y_n$, $Z_n$) can be adjusted according to equations [4]–[17] above during conversion to form the new white reference vectors ($X_{n1}'$, $Y_{n1}'$, $Z_{n1}'$) and ($X_{n2}'$, $Y_{n2}'$, $Z_{n2}'$). After the $L^+a^+b^+$ color space data has been produced, multi-dimensional interpolation is performed to complete the characterization of each of the different color imaging systems. As indicated by block 74, processor 12 calculates a mapping between the two different color imaging systems based on the interpolated $L^+a^+b^+$ data. With different color printing systems, for example, the mapping may take the form of CMYK→C'M'Y'K'. The processor 12 can generate a color transformation table, as indicated by block 76, defined by the calculated mapping for each of a plurality of color intensity levels. The color transformation table can be used to match the output of the first color imaging system to the output of the second color imaging system.

The following non-limiting example is provided to further illustrate a system and method for characterizing a color imaging system, as well as a system and method for performing a color transformation, in accordance with the first and second embodiments of the present invention.

EXAMPLE

A first 6×6×6×6 grid of color patches was generated by a 3M Rainbow™ desktop color proofing system. A second 6×6×6×6 grid of color patches was generated using a 3M Matchprint™ III commercial color proofing system. The grids were measured by a spectrophotometer and the resulting data stored in a color data file. The grids were ordered as a matrix of increasing values of CMYK. In the matrix, all permutations of six gray levels were generated.

Spectral data obtained from each patch was converted into CIE XYZ color space using a 2° standard observer and $D_{50}$ illuminant. At this point, the CIELAB color space would dictate the use of equations [1], [2], and [3] above to convert the XYZ tristimulus values to L*a*b* color space. The RLAB color space would convert the CIE XYZ values to L a b using several intermediate matrix multiplications.

Instead, the $L^+a^+b^+$ color space of the present invention was used, as disclosed herein, by the application of equations [4]–[10] to the CIE XYZ color data. Thus, the values of $X_n Y_n Z_n$ in the CIELAB equations [1]–[3] were replaced by $X_n' Y_n' Z_n'$ as defined in equations [4]–[7]. The new $L^+a^+b^+$ color space was then used to calculate values of L*a*b* for the first and second grids generated by the 3M Rainbow™ and 3M Matchprint™ proofing systems, respectively.

Multi-dimensional interpolation was used to create a color profile for each of the two proofing systems, and a CMYK→C'M'Y'K' mapping was performed with the 3M Matchprint™ system as the target. An example of a suitable mapping technique is described in Stone et al., "Color Gamut Mapping and the Printing of Digital Color Images," ACM Transcripts on Graphics, volume 7, number 4, October 1988, pages 249–292. After slight manual adjustments were made to the resulting color transformation to minimize errors due to measurement noise, uniformity error, etc. a good visual match was achieved.

Figure 5:
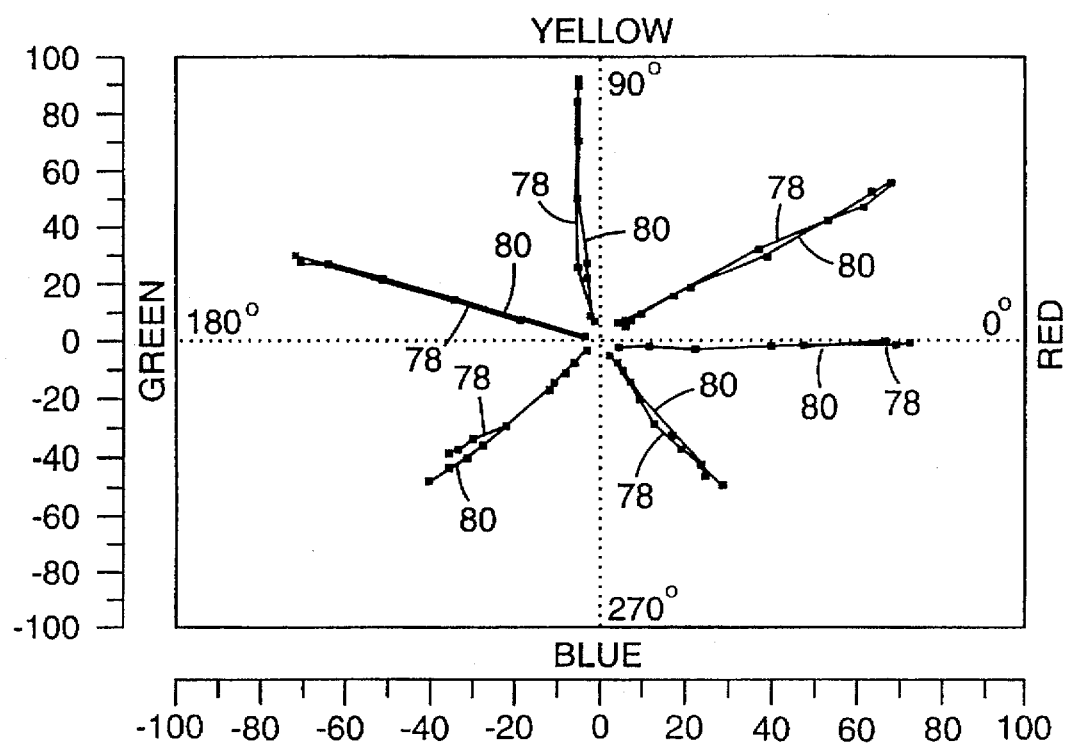
FIG. 5 is a color space plot comparing relative color responses of a color imaging system and target color imaging system after application of a color transformation generated in accordance with the second embodiment of the present invention.

FIG. 5 is a color space plot comparing relative color responses of a 3M Rainbow™ color proofing system and a target 3M Matchprint™ color proofing system after application of a color transformation table generated with the $L^+a^+b^+$ color space of the present invention to the 3M Rainbow™ color proofing system. In FIG. 5, reference numeral 78 indicates the color response of the target 3M Matchprint™ system, whereas reference numeral 80 indicates the color response of the 3M Rainbow™ system subject to the color transformation. As shown in the plot, the color transformation provided good visual results. The remaining errors that can be seen in FIG. 5 are due to errors in the mapping that could be easily fixed with the application of more sophisticated software tools. Nevertheless, the color quality was comparable to the quality of color transformations previously achieved only with the aid of laborious empirical adjustments.

Figure 6:
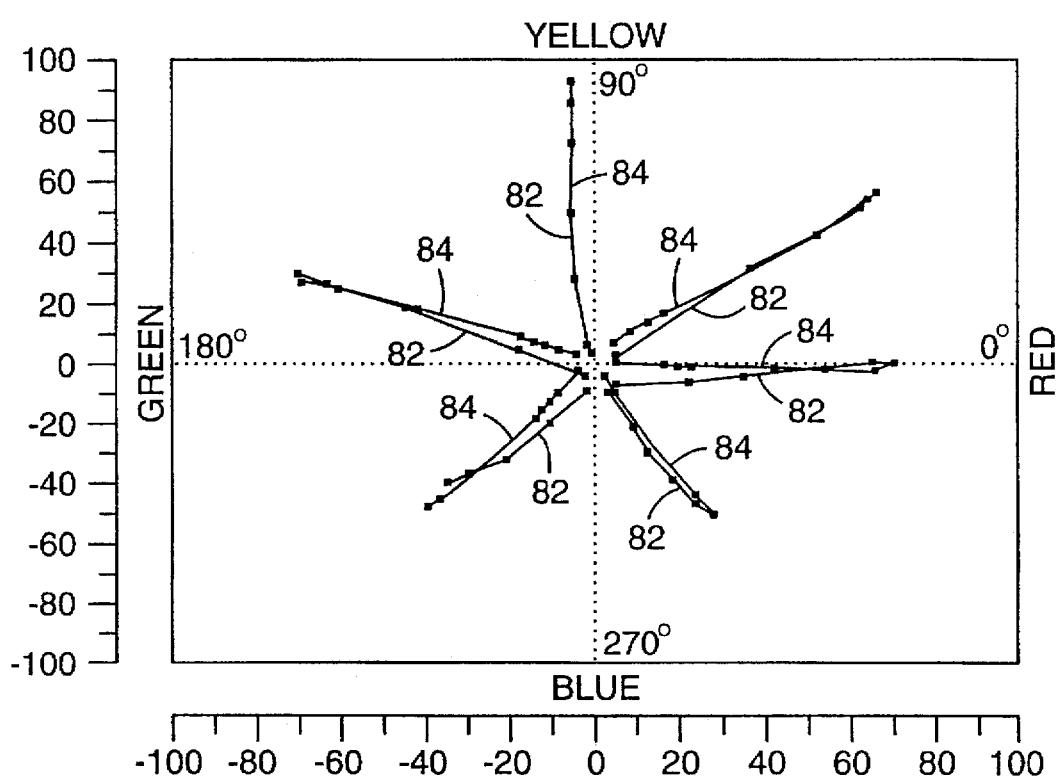
FIG. 6 is a color space plot comparing relative color responses of the color imaging system and target color imaging system represented in FIG. 5 after application of a color transformation generated using the CIELAB color space.

FIG. 6 is a color space plot comparing relative color responses of a 3M Rainbow™ color proofing system and a target 3M Matchprint™ color proofing system after application of a color transformation table generated using the conventional CIELAB color space to the 3M Rainbow™ color proofing system. FIG. 6 shows the same spectral data as that shown in FIG. 5 for 3M Rainbow™ and 3M Matchprint™ proofing systems plotted using the CIELAB color space. In FIG. 6, reference numeral 82 indicates the color response of the 3M Matchprint™ system, whereas reference numeral 84 indicates the color response of the 3M Rainbow™ system.

FIG. 6 reveals significant differences in the color response for the two systems. The differences are due to the inability of the CIELAB color space to maintain uniformity across the color range when the colors of the imaging bases associated with the two systems differ significantly. For example, FIG. 6 shows a significant shift toward blue in the data obtained for the 3M Rainbow™ system. The shift is due to the blue hue of the printing substrate used in the 3M Rainbow™ system. However, the color of the printing substrate must be used for the white reference vector in the CIELAB color space. Therefore, the mapping procedure must now endeavor to "fix" the blue shift by adding significant amounts of yellow based on empirical observations.

Figure 7:
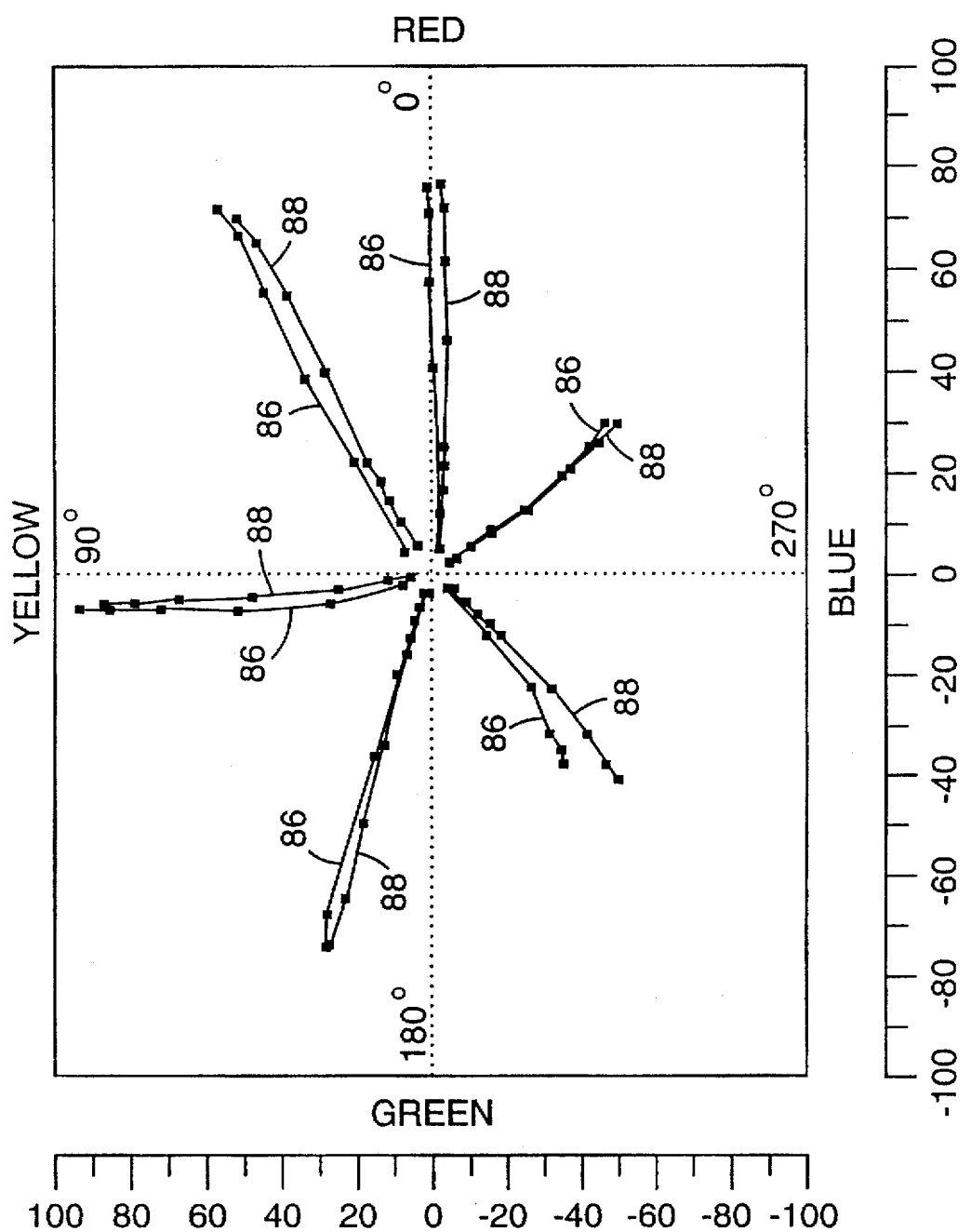
FIG. 7 is a color space plot comparing relative color responses of the color imaging system and target color imaging system represented in FIG. 5 after application of a color transformation generated using the ICPF LAB color space.

FIG. 7 is a color space plot comparing relative color responses of a 3M Rainbow™ color proofing system and a target 3M Matchprint™ color proofing system after application of a color transformation table generated using the ICPF LAB color space to the 3M Rainbow™ color proofing system. In FIG. 7, reference numeral 86 represents the color response of the target 3M Matchprint™ system, whereas reference numeral 88 represents the color response of the 3M Rainbow™ system. As shown in FIG. 7, the colors near the origin show similar values between the two systems. However, colors extending out from the origin are significantly yellow shifted. The shift is due to a shift in the entire color space toward yellow to compensate for referencing all colors to the white reference vector of the imaging base, which is blue-shifted.

Analysis of the average of the errors between the 3M Rainbow™ and 3M Matchprint™ proofing systems with the different color spaces described above reveals a systematic difference using the $L^+a^+b^+$ color space of the present invention, a significant blue shift using CIELAB, and a significant yellow shift using the ICPF color space.

The average of the errors between the 3M Rainbow™ and 3M Matchprint™ proofing systems using the $L^+a^+b^+$ color space of the present invention were:

| ΔL*   | Δa*   | Δb*  |
|-------|-------|------|
| −1.15 | −0.52 | 0.18 |

The average of the errors between the 3M Rainbow™ and 3M Matchprint™ proofing systems using the CIELAB color space were:

| ΔL*   | Δa*  | Δb*   |
|-------|------|-------|
| −1.30 | 0.02 | −1.96 |

The average of the between the 3M Rainbow™ and 3M Matchprint™ proofing systems using the ICPF color space were:

| ΔL*   | Δa*   | Δb* |
|-------|-------|------|
| −0.79 | −1.35 | 3.52 |

As indicated above, there is a significant shift toward blue or yellow in the highlight or high intensity regions using the CIELAB and ICPF color spaces when comparing two images which appear to be optimally matched in terms of overall color. There is a minimal shift, however, when the $L^+a^+b^+$ color space of the present invention is used. A system and method employing the $L^+a^+b^+$ color space therefore is very effective for performing color transformations between different color imaging systems, and especially between different color imaging systems having different imaging bases or white points.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method for characterizing a color imaging system, the method comprising the steps of:

obtaining first color data representing output of said color imaging system;

converting said first color data to second color data using a color space having a white reference vector representing an imaging base of said color imaging system; and adjusting said white reference vector of said color space during the conversion, thereby providing more accurate color characterization of said color imaging system throughout said color space.

2. The method of claim 1, wherein said step of converting said first color data includes the step of converting said first color data to $L^*a^*b^*$ data.

3. The method of claim 2, wherein said step of converting said first color data further includes the step of:

converting said first color data to said $L^*a^*b^*$ data according to the following equation:

$$L^* = 116(Y/Y_n)^{1/3} - 16,$$

$$a^* = 500[(X/X_n)^{1/3} - (Y/Y_n)^{1/3}], \text{ and}$$

$$b^* = 500[(Y/Y_n)^{1/3} - (Z/Z_n)^{1/3}],$$

wherein X, Y, Z are tristimulus values for said first color data and $X_n$, $Y_n$, $Z_n$ are white reference tristimulus values for said color imaging system; and wherein said step of adjusting said white reference further includes the step of:

adjusting said white reference tristimulus values $X_n$, $Y_n$, $Z_n$ according to intensities of said tristimulus values X, Y, Z, thereby adjusting said white reference vector of said color space.

4. The method of claim 2, wherein said step of converting said first color data further includes the step of:

converting said first color data to said $L^*a^*b^*$ data according to the following equations:

$$L^* = 116(Y/Y_n)^{1/3} - 16,$$

$$a^* = 500[(X/X_n)^{1/3} - (Y/Y_n)^{1/3}], \text{ and}$$

$$b^* = 500[(Y/Y_n)^{1/3} - (Z/Z_n)^{1/3}],$$

wherein X, Y, Z are tristimulus values for said first color data and $X_n$, $Y_n$, $Z_n$ are white reference tristimulus values for said color imaging system; and wherein said step of adjusting said white reference further includes the step of:

adjusting said white reference tristimulus values $X_n$, $Y_n$, $Z_n$ according to the following equations:

$$X_n = X_b(1 - SAT(X,Y,Z)) + X_n * SAT(X,Y,Z),$$

$$Y_n = Y_b(1 - SAT(X,Y,Z)) + Y_n * SAT(X,Y,Z), \text{ and}$$

$$Z_n = Z_b(1-SAT(X,Y,Z)) + Z_n * SAT(X,Y,Z),$$

wherein:

$$SAT(X,Y,Z) = MAX((X-X_n)/(X_k-X_n),(Y-Y_n)/(Y_k-Y_n),(Z-Z_n)/(Z_k-Z_n)),$$

wherein $X_b$, $Y_b$, $Z_b$ are tristimulus values for an imaging base associated with said color imaging system, and wherein $X_k$, $Y_k$, $Z_k$ are tristimulus values of maximum intensity values for XYZ in said color imaging system.

5. The method of claim 1 wherein the white reference vector is adjusted during the conversion according to intensities of said color data, wherein the intensities of said color data are a function of a color value from an imaging base associated with said color imaging system.

6. A system for characterizing a color imaging system, the system comprising the steps of:

means for obtaining first color data representing output of said color imaging system;

means for converting said first color data to second color data using a color space having a white reference vector representing an imaging base of said color imaging system; and means for adjusting said white reference vector of said color space during the conversion according to intensities of said first color data, thereby providing more accurate color characterization of said color imaging system throughout said color space.

7. The system of claim 6, wherein said means for converting said first color data includes means for converting said first color data to L*a*b* data.

8. The system of claim 7, wherein said means for converting said first color data further includes:

means for converting said first color data to said L*a*b* data according to the following equation:

$$L^* = 116(Y/Y_n)^{1/3} - 16,$$

$$a^* = 500[(X/X_n)^{1/3} - (Y/Y_n)^{1/3}], \text{ and}$$

$$b^* = 500[(Y/Y_n)^{1/3} - (Z/Z_n)^{1/3}],$$

wherein X, Y, Z are tristimulus values for said first color data and $X_n$, $Y_n$, $Z_n$ are white reference tristimulus values for said color imaging system; and wherein said means for adjusting said white reference further includes:

means for adjusting said white reference tristimulus values $X_n$, $Y_n$, $Z_n$ according to intensities of said tristimulus values X, Y, Z, thereby adjusting said white reference vector of said color space.

9. The system of claim 7, wherein said means for converting said first color data further includes:

means for converting said first color data to said L*a*b* data according to the following equations:

$$L^* = 116(Y/Y_n)^{1/3} - 16,$$

$$a^* = 500[(X/X_n)^{1/3} - (Y/Y_n)^{1/3}], \text{ and}$$

$$b^* = 500[(Y/Y_n)^{1/3} - (Z/Z_n)^{1/3}],$$

wherein X, Y, Z are tristimulus values for said first color data and $X_n$, $Y_n$, $Z_n$ are white reference tristimulus values for said color imaging system; and wherein said means for adjusting said white reference further includes:

means for adjusting said white reference tristimulus values $X_n$, $Y_n$, $Z_n$ according to the following equations:

$$X_n = X_b(1-SAT(X,Y,Z)) + X_n * SAT(X,Y,Z),$$

$$Y_n = Y_b(1-SAT(X,Y,Z)) + Y_n * SAT(X,Y,Z), \text{ and}$$

$$Z_n = Z_b(1-SAT(X,Y,Z)) + Z_n * SAT(X,Y,Z),$$

wherein:

$$SAT(X,Y,Z) = MAX((X-X_n)/(X_k-X_n),(Y-Y_n)/(Y_k-Y_n),(Z-Z_n)/(Z_k-Z_n)),$$

wherein $X_b$, $Y_b$, $Z_b$ are tristimulus values for an imaging base associated with said color imaging system, and wherein $X_k$, $Y_k$, $Z_k$ are tristimulus values of maximum intensity values for XYZ in said color imaging system.

10. (Amended) A method for performing a color transformation, the method comprising the steps of:

obtaining first color data representing output of a first color imaging system;

obtaining second color data representing output of a second color imaging system;

converting said first color data to third color data using a color space;

converting said second color data to fourth color data using said color space;

adjusting a first white reference vector of said color space during the conversion of said first color data according to intensities of said first color data;

adjusting a second white reference vector of said color space during the conversion of said second color data according to intensities of said second color data; and mapping said fourth color data to said third color data to generate color transformation data.

11. The method of claim 10, wherein said step of converting said first color data includes the step of converting said first color data to L*a*b* data, and said step of converting said second color data includes the step of converting said second color data to L*a*b* data.

12. The method of claim 11, wherein:

said step of converting said first color data further includes the step of: converting said first color data to said L*a*b* data according to the following equation:

$$L^* = 116(Y_1/Y_{n1})^{1/3} - 16,$$

$$a^* = 500[(X_1/X_{n1})^{1/3} - (Y_1/Y_{n1})^{1/3}], \text{ and}$$

$$b^* = 500[(Y_1/Y_{n1})^{1/3} - (Z_1/Z_{n1})^{1/3}],$$

wherein $X_1$, $Y_1$, $Z_1$ are tristimulus values for said first color data, and $X_{n1}$, $Y_{n1}$, $Z_{n1}$ are white reference tristimulus values for said first color imaging system, and wherein said step of adjusting said first white reference vector includes the step of:

adjusting said white reference tristimulus values $X_{n1}$, $Y_{n1}$, $Z_{n1}$ according to intensities of said tristimulus values $X_1$, $Y_1$, $Z_1$, thereby adjusting said first white reference vector of said color space, and wherein said step of converting said second color data further includes the step of:

converting said second color data to said L*a*b* data according to the following equation:

$$L^*=116(Y_2/Y_{n2})^{1/3}-16,$$

$$a^*=500[(X_2/X_{n2})^{1/3}-(Y_2/Y_{n2})^{1/3}], \text{ and}$$

$$b^*=500[(Y_2/Y_{n2})^{1/3}-(Z_2/Z_{n2})^{1/3}],$$

wherein $X_2$, $Y_2$, $Z_2$ are tristimulus values for said second color data, and $X_{n2}$, $Y_{n2}$, $Z_{n2}$ are white reference tristimulus values for said second color imaging system, and wherein said step of adjusting said second white reference vector includes the step of:

adjusting said white reference tristimulus values $X_{n2}$, $Y_{n2}$, $Z_{n2}$ according to intensities of said tristimulus values $X_2$, $Y_2$, $Z_2$ thereby adjusting said second white reference vector of said color space.

13. The method of claim 11, wherein: said step of converting said first color data further includes the step of:

converting said first color data to said L*a*b* data according to the following equation:

$$L^*=116(Y_1/Y_{n1})^{1/3}-16,$$

$$a^*=500[(X_1/X_{n1})^{1/3}-(Y_1/Y_{n1})^{1/3}], \text{ and}$$

$$b^*=500[(Y_1/Y_{n1})^{1/3}-(Z_1/Z_{n1})^{1/3}],$$

wherein $X_1$, $Y_1$, $Z_1$ are tristimulus values for said first color data, and $X_{n1}$, $Y_{n1}$, $Z_{n1}$ are white reference tristimulus values for said first color imaging system, and wherein said step of adjusting said first white reference vector includes the step, of:

adjusting said white reference tristimulus values $X_{n1}$, $Y_{n1}$, $Z_{n1}$ according to the following equations:

$$X_{n1}=X_{b1}(1-SAT(X_1,Y_1,Z_1))+X_{n1}*SAT(X_1,Y_1,Z_1),$$

$$Y_{n1}=Y_{b1}(1-SAT(X_1,Y_1,Z_1))+Y_{n1}*SAT(X_1,Y_1,Z_1),$$

and $$Z_{n1}=Z_{b1}(1-SAT(X_1,Y_1,Z_1))+Z_{n1}*SAT(X_1,Y_1,Z_1),$$

wherein:

$$SAT(X_1,Y_1,Z_1) = \\ MAX((X_1-X_{n1})/(X_{k1}-X_{n1}),(Y_1-Y_{n1})/(Y_{k1}-Y_{n1}), \\ (Z_1-Z_{n1})/(Z_{k1}-Z_{n1})),$$

wherein $X_{b1}$, $Y_{b1}$, $Z_{b1}$ are tristimulus values for an imaging base associated with said first color imaging system, and wherein $X_{k1}$, $Y_{k1}$, $Z_{k1}$ are tristimulus values of maximum intensity values for XYZ in said first color imaging system, and said step of converting said second color data further includes the step of:

converting said second color data to said L*a*b* data according to the following equation:

$$L^*=116(Y_2/Y_{n2})^{1/3}-16,$$

$$a^*=500[(X_2/X_{n2})^{1/3}-(Y_2/Y_{n2})^{1/3}], \text{ and}$$

$$b^*=500[(Y_2/Y_{n2})^{1/3}-(Z_2/Z_{n2})^{1/3}],$$

wherein $X_2$, $Y_2$, $Z_2$ are tristimulus values for said second color data, and $X_{n2}$, $Y_{n2}$, $Z_{n2}$ are white reference tristimulus values for said second color imaging system, and wherein said step of adjusting said second white reference vector includes the step of:

adjusting said white reference tristimulus values $X_{n2}$, $Y_{n2}$, $Z_{n2}$ according to the following equations:

$$X_{n2}=X_{b2}(1-SAT(X_2,Y_2,Z_2))+X_{n2}*SAT(X_2,Y_2,Z_2),$$

$$Y_{n2}=Y_{b2}(1-SAT(X_2,Y_2,Z_2))+Y_{n2}*SAT(X_2,Y_2,Z_2),$$

and $$Z_{n2}=Z_{b2}(1-SAT(X_2,Y_2,Z_2))+Z_{n2}*SAT(X_2,Y_2,Z_2)$$

wherein $$SAT(X_2,Y_2,Z_2) = \\ MAX((X_2-X_{n2})/(X_{k2}-X_{n2}),(Y_2-Y_{n2})/(Y_{k2}-Y_{n2}), \\ (Z_2-Z_{n2})/(Z_{k2}-Z_{n2})),$$

wherein $X_{b2}$, $Y_{b2}$, $Z_{b2}$ are tristimulus values for an imaging base associated with said second color imaging system, and wherein $X_{k2}$, $Y_{k2}$, $Z_{k2}$ are tristimulus values of maximum intensity values for XYZ in said second color imaging system.

14. A system for performing a color transformation, the system comprising:

means for obtaining first color data representing output of a first color imaging system;

means for obtaining second color data representing output of a second color imaging system;

means for converting said first color data to third color data using a color space;

means for converting said second color data to fourth color data using said color space;

means for adjusting a first white reference vector of said color space during the conversion of said first color data according to intensities of said first color data;

means for adjusting a second white reference vector of said color space during the conversion of said second color data according to intensities of said second color data; and means for mapping said fourth color data to said third color data to generate color transformation data.

15. The system of claim 14, wherein said means for converting said first color data includes means for converting said first color data to L*a*b* data, and said means for converting said second color data includes means for converting said second color data to L*a*b* data.

16. The system of claim 15, wherein: said means for converting said first color data further includes:

means for converting said first color data to said L*a*b* data according to the following equation:

$$L^*=116(Y_1/Y_{n1})^{1/3}-16,$$

$$a^*=500[(X_1/X_{n1})^{1/3}-(Y_1/Y_{n1})^{1/3}], \text{ and}$$

$$b^*=500[(Y_1/Y_{n1})^{1/3}-(Z_1/Z_{n1})^{1/3}],$$

wherein $X_1$, $Y_1$, $Z_1$ are tristimulus values for said first color data, and $X_{n1}$, $Y_{n1}$, $Z_{n1}$ are white reference tristimulus values for said first color imaging system, and wherein said means for adjusting said first white reference vector further includes:

means for adjusting said white reference tristimulus values $Y_{n1}$, $Y_{n1}$, $Z_{n1}$ according to intensities of said tristimulus values $X_1$, $Y_1$, $Z_1$, thereby adjusting said first white reference vector of said color space, and wherein said means for converting said second color data further includes:

means for converting said second color data to said $L^*a^*b^*$ data according to the following equation:

$$L^* = 116(Y_2/Y_{n2})^{1/3} - 16,$$

$$a^* = 500[(X_2/X_{n2})^{1/3} - (Y_2/Y_{n2})^{1/3}], \text{ and}$$

$$b^* = 500[(Y_2/Y_{n2})^{1/3} - (Z_2/Z_{n2})^{1/3}],$$

wherein $X_2$, $Y_2$, $Z_2$ are tristimulus values for said second color data, and $X_{n2}$, $Y_{n2}$, $Z_{n2}$ are white reference tristimulus values for said second color imaging system, and wherein said means for adjusting said second white reference vector further includes:

means for adjusting said white reference tristimulus values $X_{n2}$, $Y_{n2}$, $Z_{n2}$ according to intensities of said tristimulus values $X_2$, $Y_2$, $Z_2$, thereby adjusting said second white reference vector of said color space.

17. The system of claim 15, wherein: said means for converting said first color data further includes:

means for converting said first color data to said $L^*a^*b^*$ data according to the following equation:

$$L^* = 116(Y_1/Y_{n1})^{1/3} - 16,$$

$$a^* = 500[(X_1/X_{n1})^{1/3} - (Y_1/Y_{n1})^{1/3}], \text{ and}$$

$$b^* = 500[(Y_1/Y_{n1})^{1/3} - (Z_1/Z_{n1})^{1/3}],$$

wherein $X_1$, $Y_1$, $Z_1$ are tristimulus values for said first color data, and $X_{n1}$, $Y_{n1}$, $Z_{n1}$ are white reference tristimulus values for said first color imaging system, and wherein said means for adjusting said first white reference vector further includes:

means for adjusting said white reference tristimulus values $X_{n1}$, $Y_{n1}$, $Z_{n1}$ according to the following equations:

$$X_{n1} = X_{b1}(1 - SAT(X_1,Y_1,Z_1)) + X_{n1} * SAT(X_1,Y_1,Z_1),$$

$$Y_{n1} = Y_{b1}(1 - SAT(X_1,Y_1,Z_1)) + Y_{n1} * SAT(X_1,Y_1,Z_1),$$

and $$Z_{n1} = Z_{b1}(1 - SAT(X_1,Y_1,Z_1)) + Z_{n1} * SAT(X_1,Y_1,Z_1)$$

wherein $$SAT(X_1,Y_1,Z_1) = \\ MAX((X_1 - X_{n1})/(X_{k1} - X_{n1}), (Y_1 - Y_{n1})/(Y_{k1} - Y_{n1}), \\ (Z_1 - Z_{n1})/(Z_{k1} - Z_{n1})),$$

wherein $X_{b1}$, $Y_{b1}$, $Z_{b1}$ are tristimulus values for an imaging base associated with said first color imaging system, and wherein $X_{k1}$, $Y_{k1}$, $Z_{k1}$ are tristimulus values of maximum intensity values for XYZ in said first color imaging system, and said means for converting said second color data further includes:

means for converting said second color data to said $L^*a^*b^*$ data according to the following equation:

$$L^* = 116(Y_2/Y_{n2})^{1/3} - 16,$$

$$a^* = 500[(X_2/X_{n2})^{1/3} - (Y_2/Y_{n2})^{1/3}], \text{ and}$$

$$b^* = 500[(Y_2/Y_{n2})^{1/3} - (Z_2/Z_{n2})^{1/3}],$$

wherein $X_2$, $Y_2$, $Z_2$ are tristimulus values for said second color data, and $X_{n2}$, $Y_{n2}$, $Z_{n2}$ are white reference tristimulus values for said second color imaging system, and wherein said means for adjusting said second white reference vector further includes:

means for adjusting said white reference tristimulus values $X_{n2}$, $Y_{n2}$, $Z_{n2}$ according to the following equations:

$$X_{n2} = X_{b2}(1 - SAT(X_2,Y_2,Z_2)) + X_{n2} * SAT(X_2,Y_2,Z_2),$$

$$Y_{n2} = Y_{b2}(1 - SAT(X_2,Y_2,Z_2)) + Y_{n2} * SAT(X_2,Y_2,Z_2), \text{ and}$$

$$Z_{n2} = Z_{b2}(1 - SAT(X_2,Y_2,Z_2)) + Z_{n2} * SAT(X_2,Y_2,Z_2),$$

wherein $$SAT(X_2,Y_2,Z_2) = \\ MAX((X_2 - X_{n2})/(X_{k2} - X_{n2}), (Y_2 - Y_{n2})/(Y_{k2} - Y_{n2}), \\ (Z_2 - Z_{n2})/(Z_{k2} - Z_{n2})),$$

wherein $X_{b2}$, $Y_{b2}$, $Z_{b2}$ are tristimulus values for an imaging base associated with said second color imaging system, and wherein $X_{k2}$, $Y_{k2}$, $Z_{k2}$ are tristimulus values of maximum intensity values for XYZ in said second color imaging system.

18. A method for performing a color transformation, the method comprising the steps of:

obtaining first color data representing output of a first color imaging system;

obtaining second color data representing output of a second color imaging system;

converting said first color data to third color data using a color space having a white reference vector that is adjusted during the conversion of said first color data;

converting said second color data to fourth color data using a color space having a white reference vector that is adjusted during the conversion of said second color data; and mapping said fourth color data to said third color data to generate color transformation data.

19. A system for performing a color transformation, the system comprising:

means for obtaining first color data representing output of a first color imaging system;

means for obtaining second color data representing output of a second color imaging system;

means for converting said first color data to third color data using a color space having a white reference vector that is adjusted during the conversion of said first color data;

means for converting said second color data to fourth color data using a color space having a white reference vector that is adjusted during the conversion of said second color data; and means for mapping said fourth color data to said third color data to generate color transformation data.

* * * * *